US012560355B2

(12) United States Patent
Jolliffe

(10) Patent No.: US 12,560,355 B2
(45) Date of Patent: Feb. 24, 2026

(54) DUCT MOUNTED FILTERING APPARATUS

(71) Applicant: Carrier Corporation, Palm Beach Gardens, FL (US)

(72) Inventor: Chrystal Jolliffe, London, OH (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 533 days.

(21) Appl. No.: 17/864,949

(22) Filed: Jul. 14, 2022

(65) Prior Publication Data

US 2023/0029825 A1 Feb. 2, 2023

Related U.S. Application Data

(60) Provisional application No. 63/226,302, filed on Jul. 28, 2021.

(51) Int. Cl.
| | |
|---|---|
| *F24F 13/20* | (2006.01) |
| *B01D 46/00* | (2022.01) |
| *F24F 8/10* | (2021.01) |
| *F24F 8/108* | (2021.01) |
| *F24F 13/28* | (2006.01) |

(52) U.S. Cl.
CPC ............. *F24F 13/28* (2013.01); *B01D 46/00* (2013.01); *F24F 8/108* (2021.01); *F24F 13/20* (2013.01)

(58) Field of Classification Search
CPC . B01D 46/00; F24F 13/20; F24F 13/28; F24F 8/108
See application file for complete search history.

(56) References Cited

U.S. PATENT DOCUMENTS

| | | | |
|---|---|---|---|
| 6,571,576 | B1 | 6/2003 | Lifson et al. |
| 7,992,408 | B2 | 8/2011 | Bush et al. |
| 8,079,229 | B2 | 12/2011 | Lifson et al. |
| 8,418,482 | B2 | 4/2013 | Bush et al. |
| 8,769,982 | B2 | 7/2014 | Ignatiev et al. |
| 9,938,967 | B2 | 4/2018 | Ignatiev et al. |
| 10,145,587 | B2 | 12/2018 | Ascani |
| 10,253,766 | B2 | 4/2019 | Lifson et al. |
| 10,352,308 | B2 | 7/2019 | Bergman et al. |
| 2008/0080995 | A1 | 4/2008 | Inoue |
| 2008/0256961 | A1 | 10/2008 | Lifson et al. |
| 2018/0258922 | A1 | 9/2018 | Ascani |

FOREIGN PATENT DOCUMENTS

| | | | |
|---|---|---|---|
| DE | 10334947 A1 | | 2/2005 |
| EP | 3236072 A1 | | 10/2017 |
| JP | H0311629 Y2 | * | 3/1991 |
| RU | 2095120 C1 | * | 11/1997 |
| WO | 202084545 A1 | | 4/2020 |

* cited by examiner

*Primary Examiner* — Robert A Hopkins
(74) *Attorney, Agent, or Firm* — CANTOR COLBURN LLP

(57) ABSTRACT

An air cleaning device is provided including a unit base, at least one support member coupled to the unit base, and a plurality of panels mounted to the at least one support member. At least one of the plurality of panels includes a filtering substrate. The air cleaning device is transformable between a retracted configuration and a deployed configuration. In the deployed configuration, the plurality of panels are separated from one another to define a plurality of flow channels.

18 Claims, 8 Drawing Sheets

28

42

72

50

40

28

48

A

40

72

50

72

52

50

28

DUCT MOUNTED FILTERING APPARATUS

CROSS-REFERENCE TO RELATED APPLICATIONS

This application claims the benefit of U.S. Provisional Application No. 63/226,302 filed Jul. 28, 2022, the disclosure of which is incorporated herein by reference in its entirety.

BACKGROUND

Exemplary embodiments pertain to a heating, ventilation, and air conditioning (HVAC) system, and more particularly to an air cleaner associated with an HVAC system.

Heating, ventilation, and air conditioning (HVAC) systems, such as that deliver forced air to an area being conditioned for example, commonly filter the air that passes through the system. The most common types of filters are simple mechanical filters that remove particulates from the air stream as it flows therethrough. A chemical filtration capability can also be added by the insertion of certain materials such as carbon, to remove certain undesirable chemicals.

Most systems provide a space for the filter within the housing of the furnace, adjacent to the furnace via a filter rack, or with a filter media cabinet upgrade. In addition, a smaller disinfecting/filtering device has been developed to deploy UV light that install in the ductwork rather than needing to add a filter rack or filter cabinet. In this subset of devices, the filtering element is small and significant portion of the air stream may bypass the filter.

BRIEF DESCRIPTION

According to an embodiment, an air cleaning device is provided including a unit base, at least one support member coupled to the unit base, and a plurality of panels mounted to the at least one support member. At least one of the plurality of panels includes a filtering substrate. The air cleaning device is transformable between a retracted configuration and a deployed configuration. In the deployed configuration, the plurality of panels are separated from one another to define a plurality of flow channels.

In addition to one or more of the features described above, or as an alternative to any of the foregoing embodiments when the air cleaning device is in the retracted configuration, the plurality of panels are axially aligned with the unit base.

In addition to one or more of the features described above, or as an alternative to any of the foregoing embodiments when the air cleaning device is in the deployed configuration, the plurality of panels are offset from the unit base.

In addition to one or more of the features described above, or as an alternative to any of the foregoing embodiments the plurality of panels is translatable between the retracted configuration and the deployed configuration.

In addition to one or more of the features described above, or as an alternative to any of the foregoing embodiments the plurality of panels is rotatable between the retracted configuration and the deployed configuration.

In addition to one or more of the features described above, or as an alternative to any of the foregoing embodiments the at least one support member has a plurality of sections, the plurality of sections being configured to telescope between the retracted configuration and the deployed configuration.

In addition to one or more of the features described above, or as an alternative to any of the foregoing embodiments comprising a deployment mechanism operably coupled to at least one of the plurality of panels and the at least one support member, a portion of the deployment mechanism being arranged at an exterior of the unit base.

In addition to one or more of the features described above, or as an alternative to any of the foregoing embodiments comprising a light source connected to the unit base when the air cleaning device is in the deployed configuration, the light source being operably coupled to each of the plurality of flow channels.

In addition to one or more of the features described above, or as an alternative to any of the foregoing embodiments the filtering substrate of at least one of the plurality of panels includes a photocatalytic material.

In addition to one or more of the features described above, or as an alternative to any of the foregoing embodiments the plurality of panels and the plurality of flow channels are oriented parallel to a flow through the air cleaning device.

According to an embodiment, a heating, ventilation, and air conditioning (HVAC) system includes a duct having a width and an air cleaning device is connected to the duct. The air cleaning device includes a support member and a plurality of panels mounted to the support member. The air cleaning device is transformable between a retracted configuration and a deployed configuration. In the deployed configuration, the plurality of panels are spaced from one another over the width of the duct.

In addition to one or more of the features described above, or as an alternative to any of the foregoing embodiments a plurality of flow channels are formed between the plurality of panels, the plurality of panels being oriented parallel to a flow through the duct.

In addition to one or more of the features described above, or as an alternative to any of the foregoing embodiments the plurality of panels extend over at least 70% of the width of the duct.

In addition to one or more of the features described above, or as an alternative to any of the foregoing embodiments the air cleaning device further comprises a unit base coupled to the support member, the unit base being mounted adjacent to an exterior surface of the duct According to an embodiment, a method of installing an air cleaning device in a duct of a heating, ventilation and air conditioning system includes inserting a support member and a plurality of panels coupled to the support member into an interior of the duct via an opening, mounting a unit base connected to the support member to an exterior surface of the duct in overlapping arrangement with the opening, and transforming the air cleaning device between a retracted configuration and a deployed configuration.

In addition to one or more of the features described above, or as an alternative to any of the foregoing embodiments a footprint of the air cleaning device when in the deployed configuration is greater than the footprint of the air cleaning device when in the retracted configuration.

In addition to one or more of the features described above, or as an alternative to any of the foregoing embodiments the footprint of the air cleaning device when in the deployed configuration is greater than the opening.

In addition to one or more of the features described above, or as an alternative to any of the foregoing embodiments transforming the air cleaning device between the retracted configuration and the deployed configuration further comprises translating at least one of the support member and the plurality of panels within the interior of the duct.

In addition to one or more of the features described above, or as an alternative to any of the foregoing embodiments transforming the air cleaning device between the retracted configuration and the deployed configuration further comprises rotating at least one of the plurality of panels within the interior of the duct.

In addition to one or more of the features described above, or as an alternative to any of the foregoing embodiments transforming the air cleaning device between the retracted configuration and the deployed configuration further comprises extending a length of at least one the plurality of panels within the interior of the duct.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
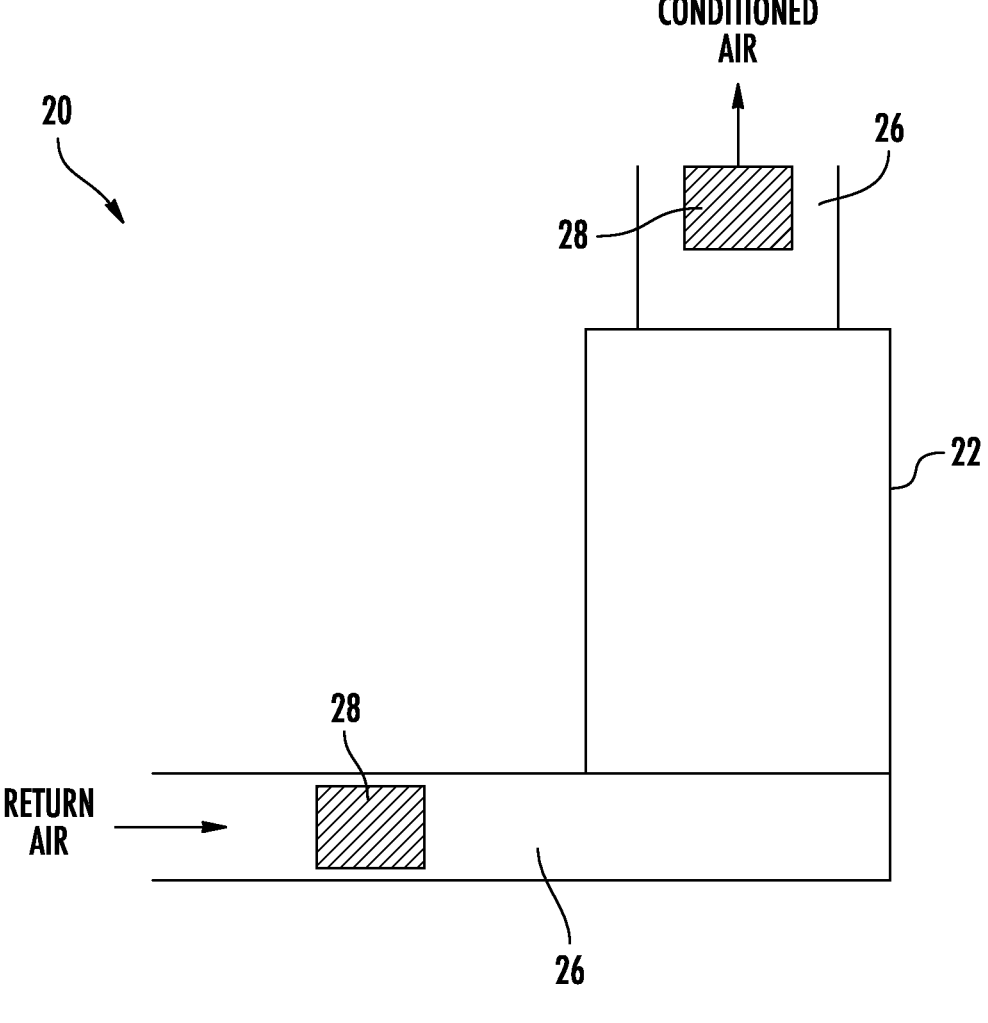
FIG. 1 is a schematic diagram of an example of a portion of a heating, ventilation, and air conditioning (HVAC) system.

With reference now to FIG. 1, a schematic diagram of a portion of a heating, ventilation, and air conditioning (HVAC) system 20 used to provide a flow of conditioned air to an area, such as a building or a portion of a building for example, is shown. The illustrated, non-limiting HVAC system 20 is a forced air system including a heat exchanger 22, such as furnace and/or an air coil for example, a return air duct 24, and an outlet duct 26. In operation, air is configured to flow vertically upward from the return air duct 24, through the heat exchanger 22 to one or more outlet ducts 26 used to deliver the conditioned air to a desired area of the building.

At least one air cleaning device 28 may be supported within the air stream of the HVAC system 20. As shown, the air cleaning device 28 may be arranged upstream from the heat exchanger 22, such as within the return air duct 24, and/or may be mounted within an outlet duct 26 downstream from the heat exchanger 22. The air cleaning device 28 may be mounted within the existing ductwork of the system 20; however, embodiments where the air cleaning device 28 is mounted within a cabinet or housing supporting the heat exchanger 22, such as the furnace housing for example are within the scope of the disclosure. Further, in other embodiments, the air cleaning device 28 may be mounted within a separate component, such as an air cleaner cabinet or filter cabinet, disposed upstream or downstream form the heat exchanger 22 relative to the air flow. It should be understood that the HVAC system 20 illustrated and described herein is intended as an example only and that an HVAC system 20 having another configuration is also within the scope of the disclosure.

With reference now to FIGS. 2-6B, various embodiments of an air cleaning device 28 are illustrated in more detail. As shown in each of the embodiments, the air cleaning device 28 includes at least one support member 40 and a plurality of panels 42 connected to the one or more support members 40. Although two substantially identical support members 40 are shown connected to each of the panels 42 near a bottom thereof, embodiments having any number of support members 40 and embodiments where the one or more support members 40 are connected to the plurality of panels 42 at any location are contemplated herein. The panels 42 may include a filtering substrate configured to collect particulate from the air flow as it passes over one or more surfaces of each of the panels 42. The panels 42 and the filtering substrate associated with the panels 42 may have any suitable construction. For example, the panels 42 and/or the filtering substrate may be solid, air permeable, rigid or flexible. The plurality of panels 42 of the air cleaning device 28 may have similar constructions, or alternatively, may have varying constructions. In the illustrated, non-limiting embodiment, each of the plurality of panels 42 is substantially identical in size and shape. However, embodiments where a size and/or shape of at least one of the panels 42 is different from another of the panels 42 is also within the scope of the disclosure.

Figure 2:
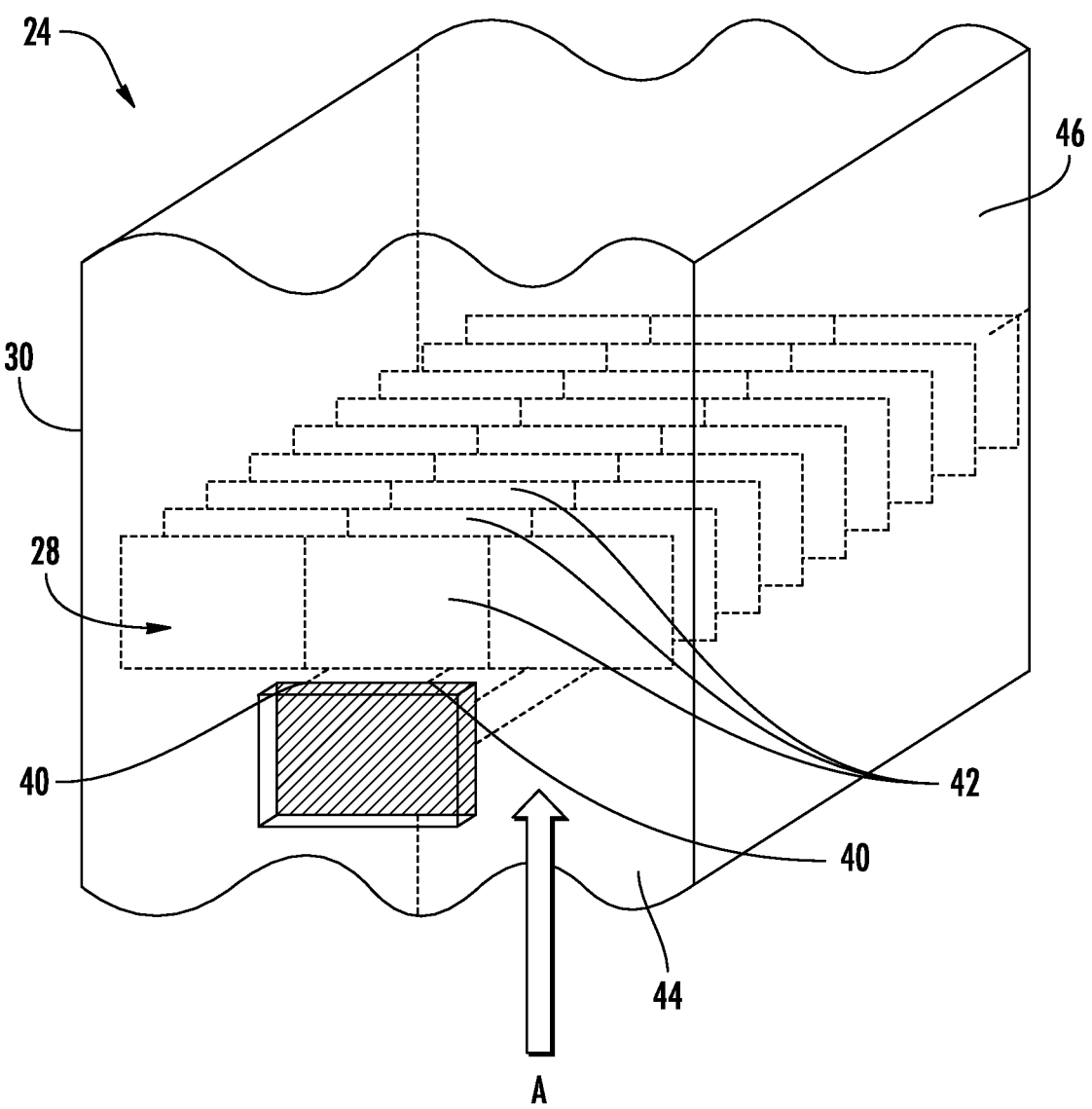
FIG. 2 is a perspective view of an exemplary air cleaning device arranged within a duct of an HVAC system according to an embodiment.

In use, the air cleaning device 28 is configured to extend between two opposing sidewalls 44, 46, of a duct 30, such as return air duct 24 or outlet duct 26 (best shown in FIG. 2). The plurality of panels 42 of the air cleaning device 28 are arranged over the substantial majority of at least one dimension, such as a width of the duct 30. For example, the panels 42 may be arranged over at least 70% of a width of the duct 30, over at least 80% of the width of the duct 30, over at least 85% of the width of the duct 30, over at least 90% of a width of the duct 30, and in some embodiments, over at least 95% of a width of the duct 30.

Figures 3, 3A, 3B:
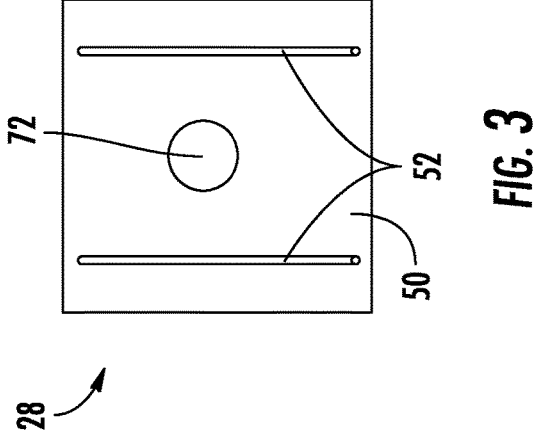
FIG. 3 is an end view of an exemplary air cleaning device according to an embodiment.
FIG. 3A is a side view of the exemplary air cleaning device of FIG. 3 in a retracted configuration according to an embodiment.
FIG. 3B is a side view of the exemplary air cleaning device of FIG. 3 in a deployed configuration according to an embodiment.

As best shown in FIGS. 2 and 3B, the plurality of panels 42 may be oriented substantially parallel to the direction of the air flow (indicated by arrow A) and are separated from one another by a distance such that a fluid flow path or flow channel 48 is defined between each pair of adjacent panels 42. The distance separating each pair of panels 42, or the width of each of the air flow channels 48 may, but need not be uniform. In an embodiment, each of the panels 42 of the air cleaning device 28 has a thickness less than or equal to about ⅛ inches. Although anywhere between 9 and 15 panels 42 are shown in the illustrated embodiments, it should be understood that the total number of panels 42 of the air cleaning device 28, the thickness of each panel 42, and the spacing between adjacent panels 42 may vary based on the dimensions of the portion of the duct 30 where the air cleaning device 28 is mounted.

Figure 4A:
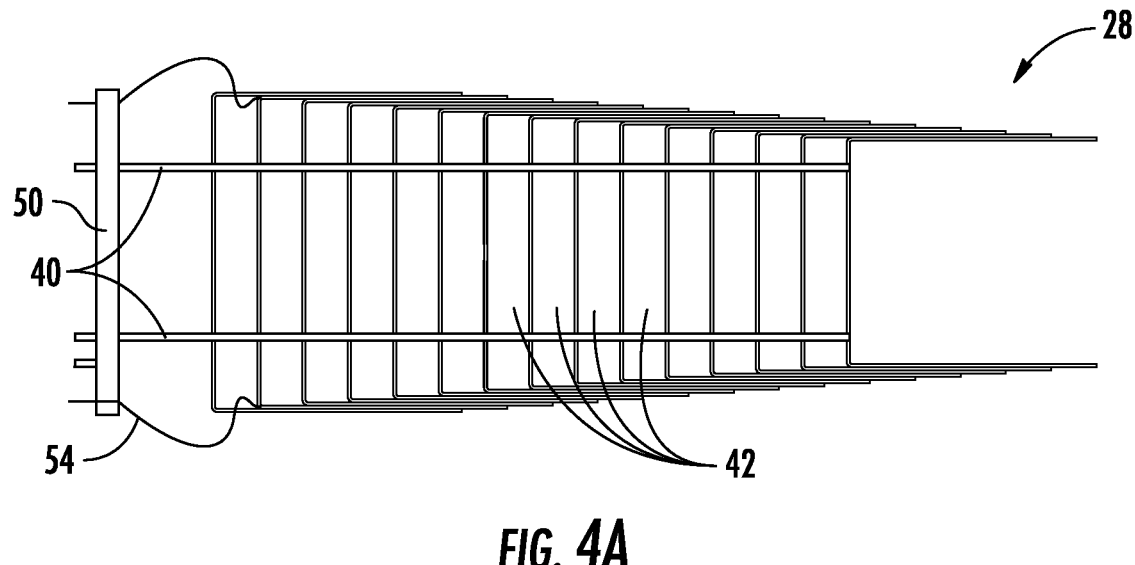
FIG. 4A is a bottom view of an exemplary air cleaning device in a retracted configuration according to an embodiment.
Figure 4B:
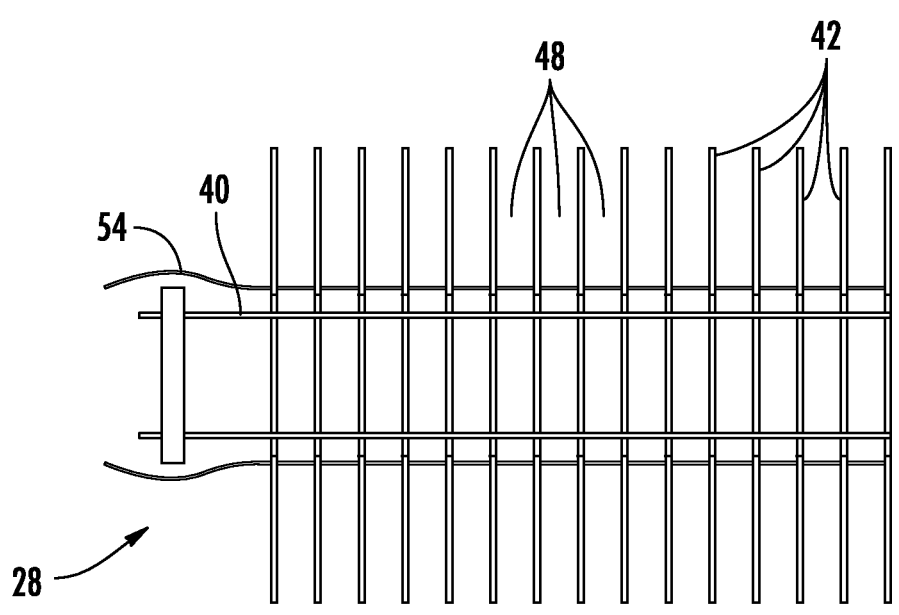
FIG. 4B is a bottom view of the exemplary air cleaning device of FIG. 4A in a deployed configuration according to an embodiment.
Figures 5A, 5B:
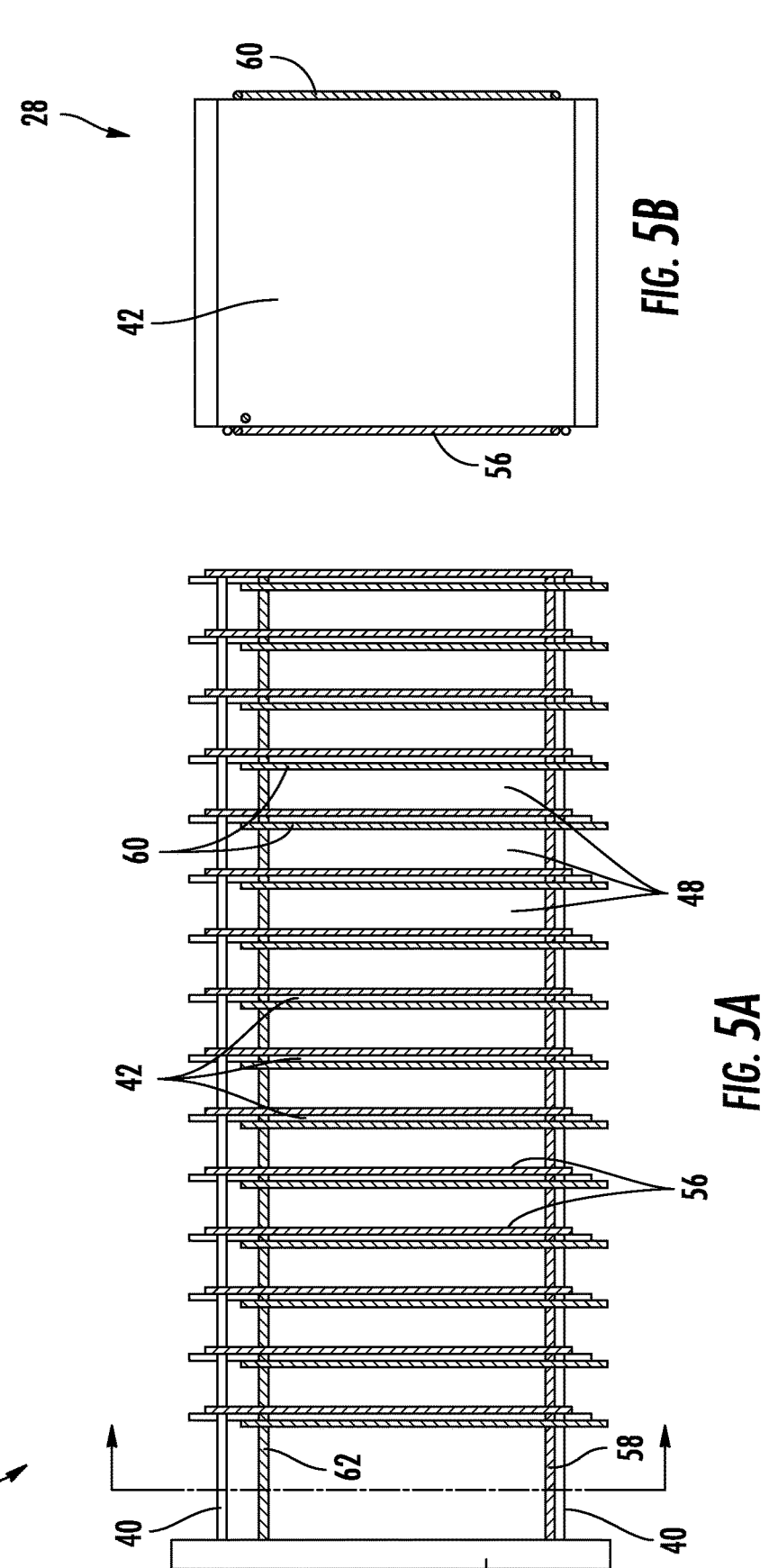
FIG. 5A is a bottom view of an exemplary air cleaning device in a retracted configuration according to an embodiment.
FIG. 5B is an end view of a portion of the exemplary air cleaning device of FIG. 5A according to an embodiment.
Figures 5C, 5D:
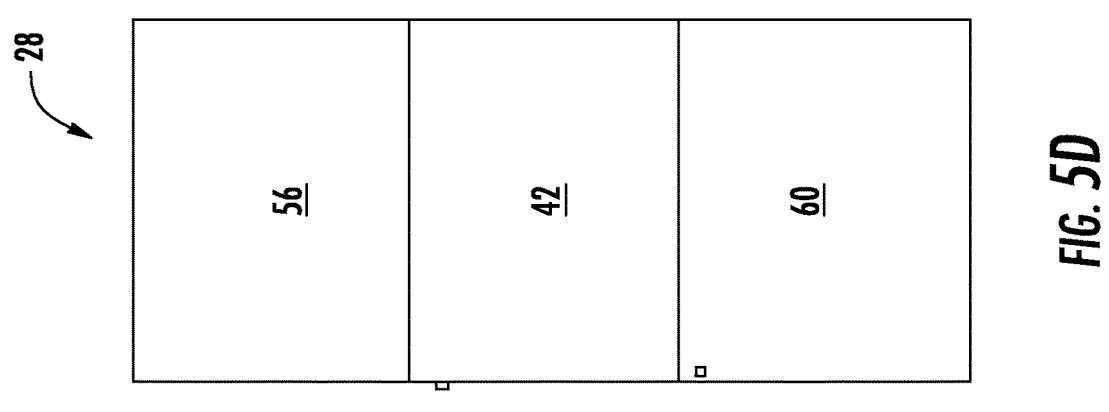
FIG. 5C is a bottom view of the exemplary air cleaning device of FIG. 5A in a deployed configuration according to an embodiment.
FIG. 5D is an end view of a portion of the exemplary air cleaning device of FIG. 5C according to an embodiment

The air cleaning device 28 is transformable between a collapsed or retracted configuration (FIGS. 3A, 4A, 5A) and an expanded or deployed configuration (FIGS. 3B, 4B, 5C). In an embodiment, the at least one support member 40 and/or the plurality of panels 42 are configured to move to transform the air cleaning device 28 between the retracted and deployed configurations. The air cleaning device 28 may be in the retracted configuration during installation within the duct 30.

In an embodiment, best shown in FIG. 3, the air cleaning device 28 further includes a unit base 50 and the at least one support member 40 is coupled to and extends from a surface of the unit base 50. When the air cleaning device 28 is installed relative to the duct 30, the at least one support member 40 and the plurality of panels 42 mounted to the at least one support member 40 are receivable within the interior 27 of the duct 30 via an opening (not shown) formed in a sidewall of the duct 30. The unit base 50 may be mounted adjacent to an exterior surface of the duct 30 in overlapping arrangement with the opening to maintain the position of the support members 40 and the panels 42 within the duct 30. In such embodiments, the footprint defined by the dimensions of the panels 42 and support members 40 when the air cleaning device 28 is in the retracted configuration are smaller than the dimensions of the opening (which may be a 6 inch by 6 inch cutout in certain instances). Although it should be appreciated that the size of the opening may vary in certain instances (e.g., being less than 36 square inches, or greater than 36 square inches in certain instances).

In an embodiment, the support member(s) 40 and/or the plurality of panels 42 are configured to move in one or more directions when transforming the air cleaning device 28 between the retracted and deployed configurations. As a result of this movement, the footprint of the support member and the plurality of panels 42 may be greater than the footprint when in the retracted position and the dimensions of the opening. In the non-limiting embodiment best shown in FIGS. 3A and 3B, the plurality of panels 42 are movable in a plane parallel to the direction of air flow A. In the retracted configuration, best shown in FIG. 3A, the plurality of panels 42 may be substantially aligned with the unit base 50 along an axis extending across the width of the duct 30.

The air cleaning device 28 is transformable between a retracted configuration and a deployed configuration via operation of a deployment mechanism 54. The deployment mechanism 54 may move the at least one support member 40 and/or the plurality of panels 42 via one or more of a winding, folding, sliding, or telescoping motion. With continued reference to FIGS. 3, 3A, and 3B, in the illustrated, non-limiting embodiment, the at least one support member 40 is translatable within a slot 52 formed in the unit base 50. The slot 52 may be oriented substantially perpendicular to the axis extending across the width of the duct 30, such that the at least one support member 40 and the plurality of panels 42 mounted thereto are configured to translate vertically upwardly or downwardly relative to the unit base 50. In such embodiments, the plurality of panels 42 when in the deployed configuration, are vertically offset from the unit base 50 (see FIG. 3B). A portion of the at least one support member 40 may be exposed at an exterior of the unit base 50 for access via an operator. Accordingly, the portion of the at least one support member 40 extending from the unit base 50 and the slot 52 cooperate to form a deployment mechanism 54 for transforming the air cleaning device 28 between the retracted and deployed configurations.

With reference to FIGS. 4A and 4B, in another embodiment, each of the plurality of panels 42 is configured to rotate about an axis relative to the at least one support member 40 in response to operation of the deployment mechanism 54. In the retracted position (FIG. 4A), the plurality of panels 42 may be arranged generally horizontally and in a partially overlapping arrangement. One or more deployment mechanisms 54, such as a string or cord for example, is operably coupled to each of the plurality of panels 42. As previously noted, when in this generally horizontal configuration, the plurality of panels 42 and the at least one support member 40 may be inserted into the interior of the duct 30 via the opening. When mounted relative to the duct 30, an end of the deployment mechanism 54 is arranged at the exterior of the duct 30, such as extending from the unit base 50 for example. Application of a force to the deployment mechanism 54 causes each of the plurality of panels 42 to pivot about an axis, such as from a generally horizontal orientation to a generally vertical orientation (FIG. 4B). Although the rotation is described herein as being from a generally horizontal configuration to a vertical configuration, it should be understood that rotation of the panels 42 in any direction is within the scope of the disclosure.

In yet another embodiment, the plurality of panels 42 may include at least one extension associated with one or more of the panels 42, the at least one extension being deployable between a retracted and extended configuration. With reference now to FIGS. 5A-5D, each of the plurality of panels 42 includes a first extension 56 supported by at least one first rail 58 and a second extension 60 supported by at least one second rail 62. When the air cleaning device 28 is in the retracted configuration, the plurality of panels 42 and the plurality of first and second extensions 56, 60 associated with the plurality of panels 42 are generally aligned about the axis extending across the width of the duct 30 (see FIG. 5A).

To transform the air cleaning device 28 to the deployed configuration, the plurality of first extensions 56 are moved in a first direction relative to the plurality of panels 42 and the plurality of second extensions 60 are moved in a different, second direction relative to the plurality of panels 42. As shown, the first and second directions may be opposite one another such that the first and second extensions 56, 60 are configured to move laterally, thereby extending the length of each panel 42 (defined by the panel 42 and the first and second extensions 56, 60 in combination) measured perpendicular to the axis extending across the width of the duct 30.

A separate deployment mechanism 54 may be associated with the plurality of first extensions 56 and the plurality of second extensions 60, respectively. However, in other embodiments, a single deployment mechanism 54 may be used for both the first and second extensions 56, 60. In an embodiment, the one or more deployment mechanisms 54 includes a cord as previously described, to which a force is applied by a user, such as the person installing the air cleaning device for example. Alternatively, the deployment mechanism 54 may simply be an exposed end of the first and second rails 58, 62. In yet another embodiment, the first and second rails 58, 62 may be elastically or spring loaded relative to a slot or channel.

The at least one support member 40 described with respect to each of the illustrated, non-limiting embodiments has a generally fixed length as the air cleaning device 28 transforms between the retracted and deployed configurations. Accordingly, at least a portion of each of the plurality of panels 42 is arranged at a final position relative to the width of the duct 30 when in the retracted configuration. However, embodiments where the at least one support member 40 and/or the plurality of panels 42 are configured to move along the axis extending across the width of the duct as the air cleaning device 28 transforms between the retracted and deployed configurations are also contemplated herein. For example, the at least one support member 40 may include a plurality of telescoping sections, and each of the plurality of panels 42 may be mounted to a corresponding telescoping section. In such embodiments, when in the retracted configuration, the plurality of panels 42 are generally clustered or arranged adjacent to the unit base 50. As a result, the axial position of one or more of the panels 42 is adjusted as the air cleaning device 28 transforms between the retracted and deployed configurations.

Figure 6:
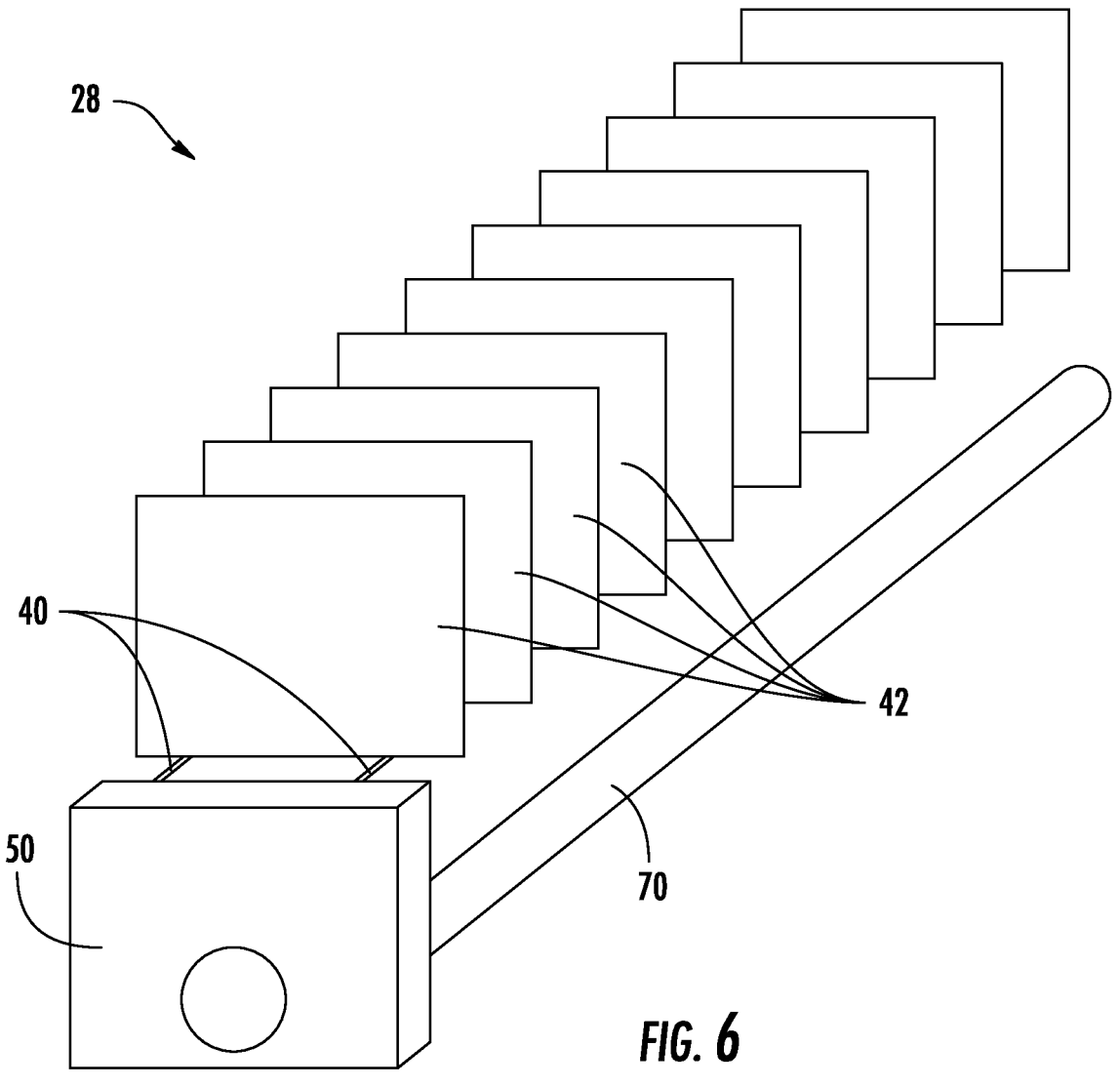
FIG. 6 is a perspective view of an exemplary air cleaning device in a deployed configuration according to another embodiment.
Figure 6A:
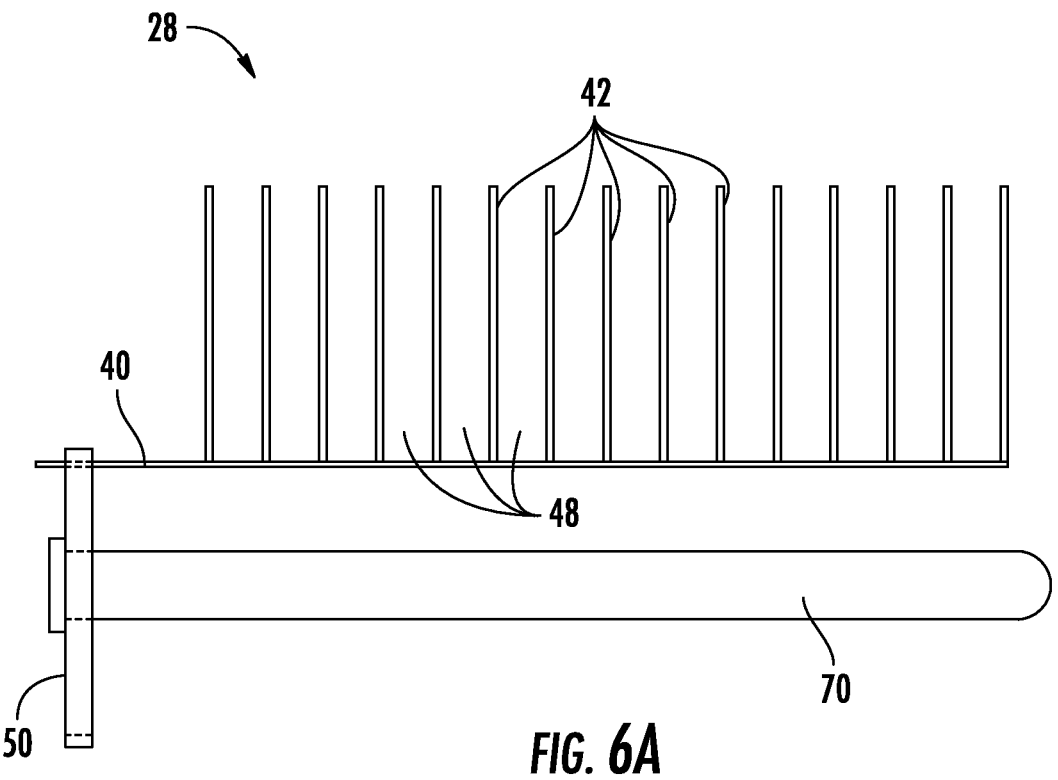
FIG. 6A is a side view of the exemplary air cleaning device of FIG. 6 according to an embodiment.
Figure 6B:
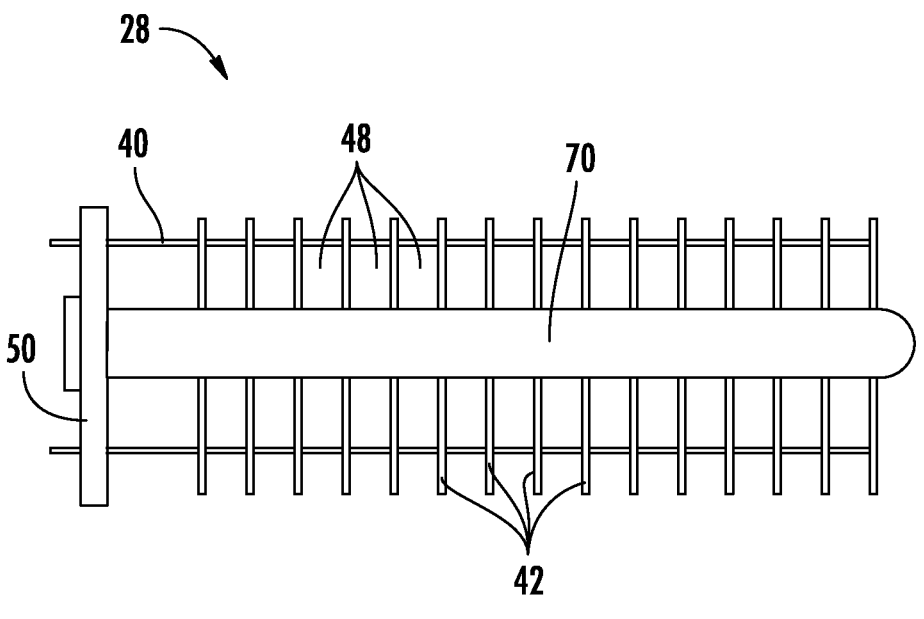
FIG. 6B is a bottom view of the exemplary air cleaning device of FIG. 6A according to an embodiment.

With reference now to FIGS. 6, 6A, and 6B, in an embodiment, one or more of the plurality of panels 42 includes a filter substrate including a photocatalytic material. As described herein, a photocatalytic material is configured to deactivate or neutralize a microbe arranged in contact with the photocatalytic material when the photocatalytic material is activated by a light having a specific wavelength. Suitable wavelengths include ultraviolet light, visible light, or any other desired wavelength. Any photocatalytic material exhibiting a band gap which can be excited by incident light to create positive holes and electrons of sufficient energy to create oxidizing and reducing radicals may be suitable. Examples of photocatalytic materials include, but are not limited to, titanium dioxide (TiO2) and doped titanium dioxide, magnesium oxide (MnOx) and zinc oxide (ZnO), for example.

In embodiments where one or more of the panels 42 includes a photocatalyst, the air cleaning device 28 additionally includes a light source 70 configured to activate the photocatalytic material, such as an ultraviolet light source for example. When installed within the duct 30, the light source 70 is configured to emit light through each of the plurality of air flow channels 48 defined by the plurality of panels 42. Accordingly, the light source 70 may extend over a substantially same width of the duct 30 as the plurality of panels 42.

In an embodiment, the light source 70 is installed within the duct 30 after the air cleaning device 28 has been transformed from the retracted configuration to the deployed configuration. In the illustrated, non-limiting embodiment, the light source 70 is insertable into the duct 30 through an opening 72 formed in the unit base 50 once the support members 40 and the plurality of panels 42 mounted thereto have translated out of alignment with the unit base 50. As a result, the light source 70, which may have a substantially linear configuration is located within the duct 30 in alignment with the unit base 50. At this position, the light source 70 is also positioned in alignment with, such as directly underneath for example, the plurality of panels 42.

An air cleaning device having an expandable configuration will extend deeper into a duct 30, providing substantially more surface area than an existing air cleaning device. In addition, the air cleaning device 28 may be configured to transform to fully utilize the space within a duct to perform meaningful volatile organic compound and particulate removal.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air cleaning device comprising:
   a unit base;
   at least one support member coupled to the unit base; and
   a plurality of panels mounted to the at least one support member, at least one of the plurality of panels including a filtering substrate, wherein the air cleaning device is transformable between a retracted configuration and a deployed configuration, and in both the retracted configuration and the deployed configuration, the plurality of panels are separated from one another to define a plurality of flow channels; and
   wherein the at least one support member has a plurality of sections, the plurality of sections being configured to telescope between the retracted configuration and the deployed configuration.

2. The air cleaning device of claim 1, wherein when the air cleaning device is in the retracted configuration, the plurality of panels are axially aligned with the unit base.

3. The air cleaning device of claim 2, wherein when the air cleaning device is in the deployed configuration, the plurality of panels are offset from the unit base.

4. The air cleaning device of claim 1, wherein the plurality of panels is translatable between the retracted configuration and the deployed configuration.

5. The air cleaning device of claim 1, further comprising a deployment mechanism operably coupled to at least one of the plurality of panels and the at least one support member, a portion of the deployment mechanism being arranged at an exterior of the unit base.

6. The air cleaning device of claim 1, further comprising a light source connected to the unit base when the air cleaning device is in the deployed configuration, the light source being operably coupled to each of the plurality of flow channels.

7. The air cleaning device of claim 6, wherein the filtering substrate of at least one of the plurality of panels includes a photocatalytic material.

8. The air cleaning device of claim 1, wherein the plurality of panels and the plurality of flow channels are oriented parallel to a flow through the air cleaning device.

9. A heating, ventilation, and air conditioning (HVAC) system comprising:

a duct having a width;

an air cleaning device connected to the duct, the air cleaning device comprising:

a support member; and a plurality of panels mounted to the support member;

wherein the air cleaning device is transformable between a retracted configuration and a deployed configuration via movement of the plurality of panels in a plane extending parallel to a direction of flow through the duct, and in the deployed configuration, the plurality of panels are spaced from one another over the width of the duct; and wherein the support member has a plurality of sections, the plurality of sections being configured to telescope between the retracted configuration and the deployed configuration.

10. The HVAC system of claim 9, wherein a plurality of flow channels are formed between the plurality of panels, the plurality of panels being oriented parallel to a flow through the duct.

11. The HVAC system of claim 9, wherein the plurality of panels extend over at least 70% of the width of the duct.

12. The HVAC system of claim 9, wherein the air cleaning device further comprises a unit base coupled to the support member, the unit base being mounted adjacent to an exterior surface of the duct.

13. A method of installing an air cleaning device in a duct of a heating, ventilation and air conditioning system, comprising:

inserting a support member and a plurality of panels coupled to the support member into an interior of the duct via an opening;

mounting a unit base connected to the support member to an exterior surface of the duct in overlapping arrangement with the opening;

transforming the air cleaning device from a retracted configuration to a deployed configuration after inserting the support member and the plurality of panes into the interior of the duct via movement of the support member and the plurality of panels coupled to the support member in a plane extending parallel to a direction of flow through the duct, wherein the air cleaning device remains in a deployed configuration during operation of the heating, ventilation and air conditioning system; and wherein the support member has a plurality of sections, the plurality of sections being configured to telescope between the retracted configuration and the deployed configuration.

14. The method of claim 13, wherein a footprint of the air cleaning device when in the deployed configuration is greater than the footprint of the air cleaning device when in the retracted configuration.

15. The method of claim 14, wherein the footprint of the air cleaning device when in the deployed configuration is greater than the opening.

16. The method of claim 13, wherein transforming the air cleaning device between the retracted configuration and the deployed configuration further comprises translating at least one of the support member and the plurality of panels within the interior of the duct.

17. The method of claim 13, wherein transforming the air cleaning device between the retracted configuration and the deployed configuration further comprises rotating at least one of the plurality of panels within the interior of the duct.

18. The method of claim 13, wherein transforming the air cleaning device between the retracted configuration and the deployed configuration further comprises extending a length of at least one the plurality of panels within the interior of the duct.

\* \* \* \* \*